US009850827B2

United States Patent
Fei et al.

(10) Patent No.: US 9,850,827 B2
(45) Date of Patent: Dec. 26, 2017

(54) METHOD AND APPARATUS FOR FUEL INJECTION AND DYNAMIC COMBUSTION CONTROL

(71) Applicant: Westport Power Inc., Vancouver (CA)

(72) Inventors: Wei Fei, Burnaby (CA); James D. Walker, Malvern (GB); Gordon P. McTaggart-Cowan, Vancouver (CA); Kenneth R. Mann, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 0 days.

(21) Appl. No.: 15/107,885

(22) PCT Filed: Dec. 16, 2014

(86) PCT No.: PCT/CA2014/051219
§ 371 (c)(1),
(2) Date: Jun. 23, 2016

(87) PCT Pub. No.: WO2015/095955
PCT Pub. Date: Jul. 2, 2015

(65) Prior Publication Data
US 2016/0326970 A1    Nov. 10, 2016

(30) Foreign Application Priority Data

Dec. 23, 2013   (CA) ..................................... 2838120

(51) Int. Cl.
*F02D 41/30* (2006.01)
*F02D 19/06* (2006.01)
(Continued)

(52) U.S. Cl.
CPC ....... *F02D 19/061* (2013.01); *F02D 19/0689* (2013.01); *F02D 19/0694* (2013.01);
(Continued)

(58) Field of Classification Search
CPC .... F02D 19/061; F02D 19/10; F02D 19/0694; F02D 19/0689; F02D 41/3011;
(Continued)

(56) References Cited

U.S. PATENT DOCUMENTS 6,202,601 B1   3/2001   Ouellette et al.
6,386,149 B1   5/2002   Coleman et al.
(Continued)

FOREIGN PATENT DOCUMENTS

CA   2 767 247 A1   4/2012
CA   2 853 740 A1   5/2013
(Continued)

OTHER PUBLICATIONS

International Search Report and Written Opinion of the International Searching Authority, dated Mar. 10, 2015, for International Application No. PCT/CA2014/051219, 11 pages.
(Continued)

*Primary Examiner* — Hai Huynh
(74) *Attorney, Agent, or Firm* — Seed IP Law Group LLP (57) ABSTRACT

Emission targets, such as NOx levels, for gaseous fuelled internal combustion engines that burn a gaseous fuel in a diffusion combustion mode are increasingly more challenging to achieve. A method of fuel injection for an internal combustion engine fuelled with a gaseous fuel comprises introducing a first amount of pilot fuel in a first stage of fuel injection; introducing a first amount of main fuel (the gaseous fuel) in a second stage of fuel injection; and introducing a second amount of main fuel in a third stage of fuel injection. The first and second amounts of main fuel contribute to load and speed demand of the internal combustion engine. Engine maps calibrated for different engine performance can be employed in different regions of the load and speed range of the engine. The engine maps are blended
(Continued)

when the engine transitions between two regions; and momentary excursions into different regions do not change the engine calibration.

20 Claims, 5 Drawing Sheets (51) Int. Cl.
    *F02D 19/10*     (2006.01)
    *F02D 41/40*     (2006.01)
    *F02D 35/02*     (2006.01)
    *F02D 41/00*     (2006.01)
    *F02B 43/00*     (2006.01)

(52) U.S. Cl.
    CPC ............ *F02D 19/10* (2013.01); *F02D 35/025* (2013.01); *F02D 41/0025* (2013.01); *F02D 41/0027* (2013.01); *F02D 41/3011* (2013.01); *F02D 41/3064* (2013.01); *F02D 41/401* (2013.01); *F02D 41/403* (2013.01); *F02B 43/00* (2013.01); *Y02T 10/36* (2013.01); *Y02T 10/44* (2013.01)

(58) Field of Classification Search
    CPC .. F02D 41/0025; F02D 41/401; F02D 41/403; F02D 41/3064; F02D 41/0027; F02D 41/2425; F02D 41/2429; F02D 41/2432; F02D 35/025; Y02T 10/36; Y02T 10/44; F02B 43/00

USPC ............... 123/299, 300, 525, 431, 575, 436; 701/103, 104, 105, 110

See application file for complete search history.

(56) References Cited

U.S. PATENT DOCUMENTS

| | | |
|---|---|---|
| 6,640,773 B2 | 11/2003 | Ancimer et al. |
| 6,761,325 B2 | 7/2004 | Baker et al. |
| 6,912,992 B2 | 7/2005 | Ancimer et al. |
| 7,657,361 B2 | 2/2010 | Inoue et al. |
| 8,412,439 B2 | 4/2013 | Warner et al. |
| 8,874,351 B2 | 10/2014 | Jiang et al. |

FOREIGN PATENT DOCUMENTS

| | | |
|---|---|---|
| EP | 1 492 948 B1 | 9/2008 |
| WO | 01/59280 A1 | 8/2001 |
| WO | 01/59285 A2 | 8/2001 |

OTHER PUBLICATIONS

Office Action, dated Jun. 17, 2014, for Canadian Application No. 2,838,120, 4 pages.

Extended European Search Report, Dated Oct. 11, 2017, for European Application No. 14873596.2 — 1603 / 3094848, 6 pages.

Prior Art

METHOD AND APPARATUS FOR FUEL INJECTION AND DYNAMIC COMBUSTION CONTROL

FIELD OF THE INVENTION

The present application relates to a technique of introducing a pilot fuel and a gaseous fuel into an internal combustion engine, and dynamically controlling combustion.

BACKGROUND OF THE INVENTION

It is known in gaseous fuelled, Diesel-cycle internal combustion engines to employ a pilot fuel to initiate combustion. Typical gaseous fuels, such as natural gas, have a low cetane number making auto-ignition in cylinders employing conventional compression ratios difficult. A pilot fuel, such as diesel, is introduced late in the compression stroke where it auto-ignites due to the pressure and temperature in the cylinder, thereby creating an environment suitable for the ignition of the gaseous fuel. In general, a pilot fuel can be any fuel that reliably auto-ignites with the desired timing in the conditions produced inside the combustion chamber during normal operation. For example, in an engine designed to be fuelled with diesel fuel, diesel is a suitable pilot fuel because it will auto-ignite at the temperatures and pressures produced inside the combustion chamber during the normal engine cycle.

It is known to introduce gaseous fuel in a Diesel-cycle internal combustion engine in multiple stages. The Applicant's own U.S. Pat. No. 6,640,773, issued Nov. 4, 2003 to Ancimer et al., discloses a homogenous charge direct injection engine that introduces a gaseous fuel and a pilot fuel in three stages. In a first stage, gaseous fuel is directly injected in the compression stroke such that it mixes with air forming a homogenous charge. In a second stage, a pilot fuel is introduced later in the compression stroke to initiate combustion of the homogenous charge. The amount of gaseous fuel introduced in the first stage is limited to reduce, and preferably prevent, the likelihood of premature combustion, such as engine knocking. For some parts of the engine's load and speed range not enough gaseous fuel is introduced in the first stage to meet the load requirements of the engine, and in such operating conditions gaseous fuel is directly injected in a third stage after the pilot fuel such that the load requirements of the engine are met.

The above technique has several advantages. There is a reduced likelihood of engine knock. The nitrous oxides (NOx) formation rate from combustion of the first stage gaseous fuel is very small since the premixed gaseous fuel and air burn under very lean conditions. It provides efficient operation by using stratified charge (pilot plume), lean burn and diffusion modes of combustion all in the same engine cycle, and maintains high engine output while reducing NOx emissions compared to conventional methods of operation. Nevertheless, in some implementations there are drawbacks with this technique, such as combustion stability, limited engine power and difficulties with engine calibration. Unburned hydrocarbon emissions may increase due to excessive leaning of the premixed charge.

In gaseous fuelled Diesel-cycle internal combustion engines that burn gaseous fuel in diffusion mode only, it is known that NOx formation rates can be excessive in certain regions of the load and speed range of the engine due to combustion temperature and pressure. For example, referring to FIG. 1 characteristic region 10 is illustrated for one internal combustion engine implementation where NOx formation rates are excessively high. The state of the art is lacking in techniques for reducing NOx formation rates in gaseous fuelled internal combustion engines that operate in a diffusion combustion mode. The present method and apparatus provide a technique for improving the operation of gaseous fuelled Diesel-cycle internal combustion engines operating in a diffusion combustion mode.

SUMMARY OF THE INVENTION

An improved method of fuel injection for an internal combustion engine fuelled with a gaseous fuel comprises introducing a first amount of pilot fuel in a first stage of fuel injection; introducing a first amount of main fuel in a second stage of fuel injection; and introducing a second amount of main fuel in a third stage of fuel injection. The first and second amounts of main fuel contribute to load and speed demand of the internal combustion engine. The main fuel is the gaseous fuel, and the pilot fuel and the main fuel both burn in a diffusion combustion mode. The first stage of fuel injection can occur between 50 degrees before top dead center (° BTDC) and 10° BTDC. The second stage of fuel injection can occur between 30° BTDC and 0° BTDC. The third stage of fuel injection can occur between 20° BTDC and 20 degrees after top dead center (° ATDC). Separation timing between a falling edge (ending) of a fuel injection pulse employed in the first stage of fuel injection and a rising edge (beginning) of a fuel injection pulse employed in the second stage of fuel injection can be between 200 and 400 microseconds. As used herein, rising edges are representative of beginnings of fuel injection pulses and falling edges are representative of endings of fuel injection pulses. In alternative embodiments, rising edges can be representative of endings of fuel injection pulses and falling edges can be representative of beginnings of fuel injection pulses (that is, employing negative logic). Separation timing between a falling edge (ending) of a fuel injection pulse employed in the second stage of fuel injection and a rising edge (beginning) of a fuel injection pulse employed in the third stage of fuel injection can be between 500 and 750 microseconds. The method can further comprise introducing a second amount of pilot fuel in a fourth stage of fuel injection. The fourth stage of fuel injection can occur between 0° ATDC and 50° ATDC.

In a preferred embodiment, when an operating point of the internal combustion engine transitions from a first characteristic region to a second characteristic region, for at least one of the first, second and third stages of fuel injection the method further comprises employing calibrations from a first engine map after the operating point transitions into the second characteristic region while a first measured parameter is less than a first predetermined threshold. While the first measured parameter is between the first predetermined threshold and a second predetermined threshold, the method further comprises blending calibrations from the first engine map and a second engine map; and employing the blended calibrations. When the first measured parameter is greater than the second predetermined threshold, the method comprises employing calibrations from the second engine map. The calibrations from the first and second engine maps comprise fuelling and timing calibrations. A ratio can be employed to blend the first and second engine maps, or alternatively the first and second engine maps can be blended by employing separate weighting factors for each map. The first engine map can be employed in the first characteristic region. In a preferred embodiment the first measured parameter is time and the first and second predetermined thresholds are first and second predetermined time thresholds respectively. In another preferred embodiment, the first measured parameter is a temperature that is characteristic of combustion temperature and the first and second predetermined thresholds are first and second predetermined temperature thresholds respectively.

An improved apparatus for fuel injection in an internal combustion engine fuelled with a gaseous fuel comprises a direct injection apparatus for directly introducing a pilot fuel and a main fuel into a combustion chamber of the internal combustion engine. The main fuel is the gaseous fuel. A pilot fuel supply system delivers the pilot fuel to the direct injection apparatus, and a main fuel supply system delivers the main fuel to the direct injection apparatus. A controller, configured to actuate the direction injection apparatus to introduce the pilot fuel and the main fuel into the combustion chamber, is programmed to (1) actuate the direct injection apparatus in a first stage of fuel injection to introduce a first amount of pilot fuel, (2) to actuate the direct injection apparatus in a second stage of fuel injection to introduce a first amount of main fuel, and (3) to actuate the direct injection apparatus in a third stage of fuel injection to introduce a second amount of main fuel. The first and second amounts of main fuel contribute to load and speed demand of the internal combustion engine. The pilot fuel and the main fuel burn in a diffusion combustion mode. The first stage of fuel injection can occur between 50 degrees before top dead center (° BTDC) and 10° BTDC. The second stage of fuel injection can occur between 30° BTDC and 0° BTDC. The third stage of fuel injection can occur between 20° BTDC and 20 degrees after top dead center (° ATDC). Separation timing between a falling edge (ending) of a fuel injection pulse employed in the first stage of fuel injection and a rising edge (beginning) of a fuel injection pulse employed in the second stage of fuel injection can be between 200 and 400 microseconds. Separation timing between a falling edge (ending) of a fuel injection pulse employed in the second stage of fuel injection and a rising edge (beginning) of a fuel injection pulse employed in the third stage of fuel injection can be between 500 and 750 microseconds. The controller can be further programmed to actuate the direct injection apparatus in a fourth stage of fuel injection to introduce a second amount of pilot fuel. The fourth stage of fuel injection can occur between 0° ATDC and 50° ATDC. The direct injection apparatus can comprise a concentric needle fuel injection valve. Alternatively, the direct injection apparatus can comprise a pilot fuel direct injector operatively connected with the pilot fuel supply system, and a main fuel direct injector operatively connected with the main fuel supply system.

In a preferred embodiment, when an operating point of the internal combustion engine transitions from a first characteristic region to a second characteristic region, for at least one of the first, second and third stages of fuel injection the controller is further programmed to employ calibrations from a first engine map after the operating point transitions into the second characteristic region while a first measured parameter is less than a first predetermined threshold. While the first measured parameter is between the first predetermined threshold and a second predetermined threshold, the controller is programmed to blend calibrations from the first engine map and a second engine map; and to employ the blended calibrations. When the first measured parameter is greater than the second predetermined threshold, the controller is programmed to employ calibrations from the second engine map. The calibrations from the first and second engine maps comprise fuelling and timing calibrations. A ratio can be employed to blend the first and second engine maps, or alternatively the first and second engine maps can be blended by employing separate weighting factors for each map. The controller can be programmed to employ the first engine map in the first characteristic region. In a preferred embodiment the first measured parameter is time and the first and second predetermined thresholds are first and second predetermined time thresholds respectively. In another preferred embodiment, the first measured parameter is a temperature that is characteristic of combustion temperature and the first and second predetermined thresholds are first and second predetermined temperature thresholds respectively.

In an improved method of fuel injection for an internal combustion engine fuelled with a gaseous fuel, when an operating point of the internal combustion engine transitions from a first characteristic region to a second characteristic region, when injecting the gaseous fuel, the method comprises employing calibrations from a first engine map after the operating point transitions into the second characteristic region while a first measured parameter is less than a first predetermined threshold. While the first measured parameter is between the first predetermined threshold and a second predetermined threshold, the method further comprises blending calibrations from the first engine map and a second engine map; and employing the blended calibrations. When the first measured parameter is greater than the second predetermined threshold, the method comprises employing calibrations from the second engine map. In a preferred embodiment the first measured parameter is time and the first and second predetermined thresholds are first and second predetermined time thresholds respectively. In another preferred embodiment, the first measured parameter is a temperature characteristic of combustion temperature and the first and second predetermined thresholds are first and second predetermined temperature thresholds respectively.

In a preferred embodiment, the method further comprises introducing a first amount of pilot fuel in a first stage of fuel injection; introducing a first amount of main fuel in a second stage of fuel injection; and introducing a second amount of main fuel in a third stage of fuel injection. The first and second amounts of main fuel contribute to load and speed demand of the internal combustion engine. The main fuel is the gaseous fuel.

An improved apparatus for fuel injection in an internal combustion engine fuelled with a gaseous fuel comprises a direct injection apparatus for directly introducing a main fuel into a combustion chamber of the internal combustion engine. The main fuel is the gaseous fuel. A main fuel supply system delivers the main fuel to the direct injection apparatus. A controller is configured to actuate the direction injection apparatus to introduce the main fuel into the combustion chamber. When an operating point of the internal combustion engine transitions from a first characteristic region to a second characteristic region, when injecting the gaseous fuel the controller is programmed to employ calibrations from a first engine map after the operating point transitions into the second characteristic region while a first measured parameter is less than a first predetermined threshold. While the first measured parameter is between the first predetermined threshold and a second predetermined threshold, the controller is programmed to blend calibrations from the first engine map and a second engine map; and to employ the blended calibrations. When the first measured parameter is greater than the second predetermined threshold, the controller is programmed to employ calibrations from the second engine map. In a preferred embodiment the first measured parameter is time and the first and second predetermined thresholds are first and second predetermined time thresholds respectively. In another preferred embodiment, the first measured parameter is a temperature characteristic of combustion temperature and the first and second predetermined thresholds are first and second predetermined temperature thresholds respectively.

In a preferred embodiment, the apparatus further comprises a pilot fuel supply system delivering the pilot fuel to the direct injection apparatus, the controller is further programmed to actuate the direct injection apparatus in a first stage of fuel injection to introduce a first amount of pilot fuel; to actuate the direct injection apparatus in a second stage of fuel injection to introduce a first amount of main fuel; and to actuate the direct injection apparatus in a third stage of fuel injection to introduce a second amount of main fuel.

DETAILED DESCRIPTION OF PREFERRED EMBODIMENT(S)

Figure 2:
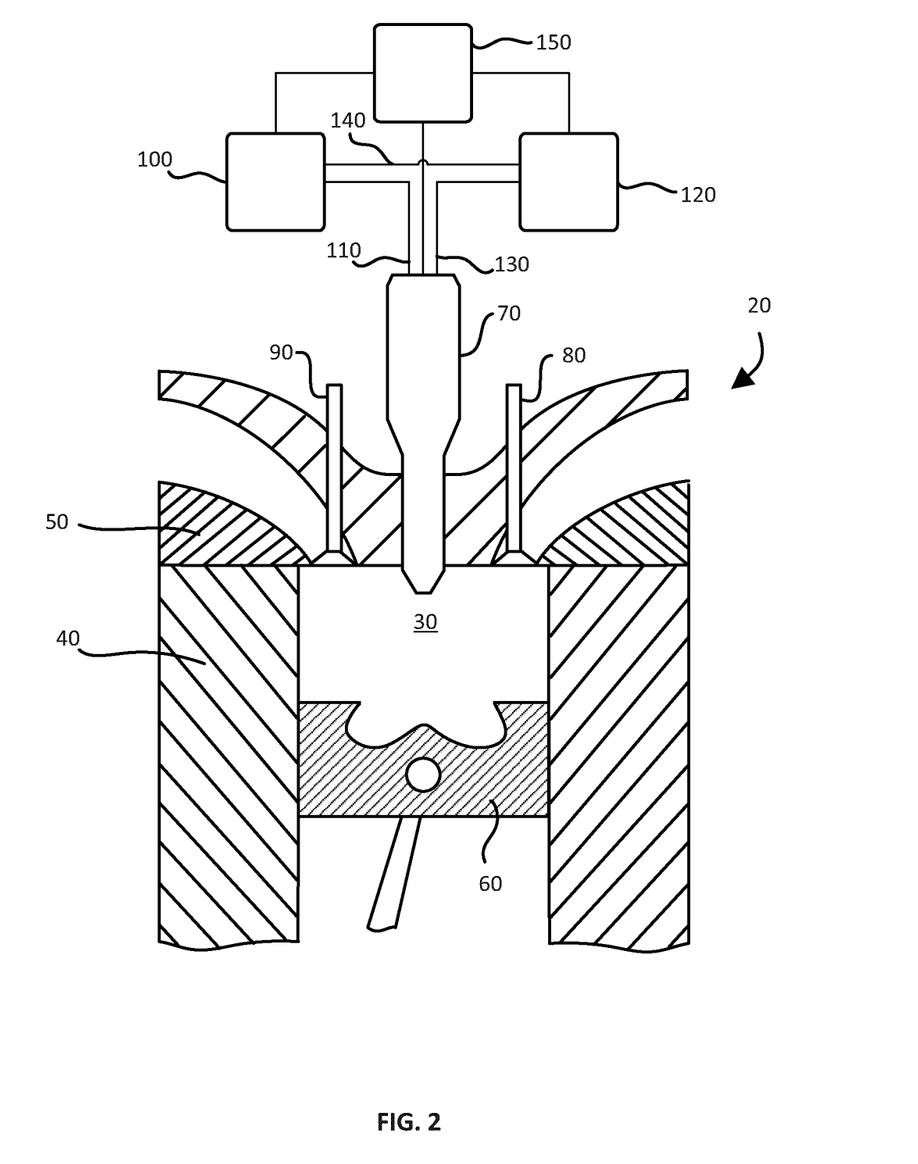
FIG. 2 is a schematic view of an internal combustion engine according to one embodiment.

Referring to FIG. 2, engine 20 comprises combustion chamber 30, which in this example is defined by cylinder wall 40, cylinder head 50 and piston 60. Only one such cylinder is shown in FIG. 2, although as would be known by those skilled in the technology engine 20 normally comprises a plurality of cylinders, and the technique disclosed herein applies to any engine having one or more cylinders. Direct fuel injector 70 directly introduces a pilot fuel and a main fuel into combustion chamber 30. In preferred embodiments the pilot fuel is a liquid fuel, such as Diesel, and the main fuel is a gaseous fuel, such as natural gas. In the illustrated embodiment, direct fuel injector 70 is a concentric needle type fuel injector, similar to that disclosed in the Applicants' U.S. Pat. No. 6,761,325, which can inject the pilot fuel separately and independently from the main fuel. In other preferred embodiments engine 20 can comprise a pilot fuel direct injector and a main fuel direct injector, either integrated side-by-side in a common injector housing, or separate from each other, instead of concentric needle type direct injector 70. In alternative embodiments direct injector 70 can introduce the pilot fuel and/or the main fuel into a pre-chamber where the fuel ignites and creates a combustion torch that enters the combustion chamber. An air charge is introduced to combustion chamber 30 through intake valve 80, and exhaust gases are evacuated from the combustion chamber through exhaust valve 90. Pilot fuel supply system 100 delivers pilot fuel to direct injector 70 through conduit 110 and main fuel supply system 120 delivers gaseous fuel to direct injector 70 through conduit 130. Conduit 140 is employed when main fuel supply system 120 requires pilot fuel, or more specifically pilot fuel pressure, to regulate gaseous fuel pressure. Controller 150 commands pilot fuel system 100 and main fuel supply 120 to deliver pilot fuel and gaseous fuel having a suitable pressure for direct injection into combustion chamber 30.

Figure 3:
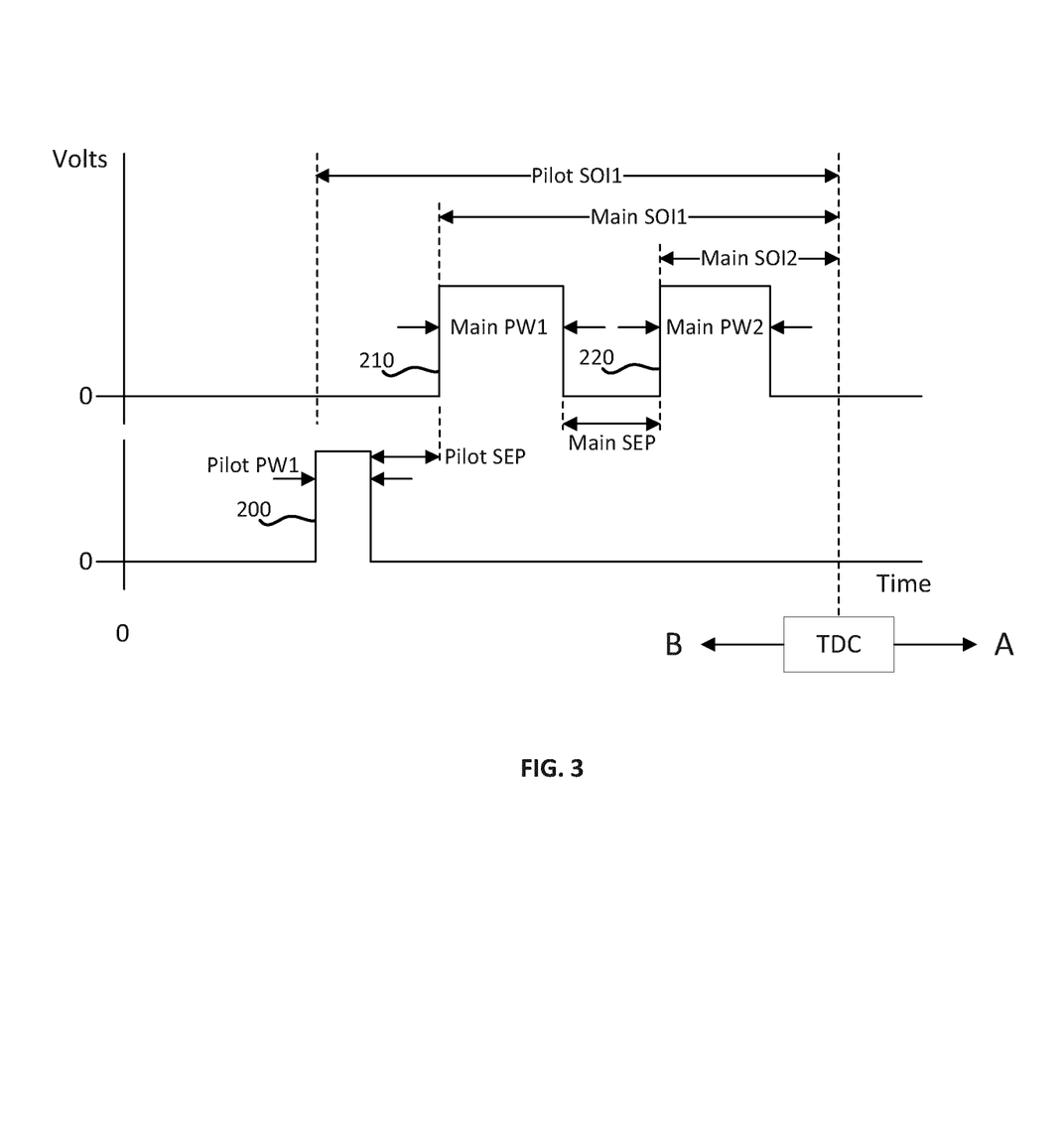
FIG. 3 is a plot view of actuation signals for a fuel injector of the engine of FIG. 2 according to a first embodiment comprising a first pilot pulse, a first main pulse and a second main pulse.

Referring to FIG. 3, a technique of introducing pilot fuel and main fuel are illustrated according to a first embodiment. Controller 150 actuates direct fuel injector 70 to introduce pilot fuel and main fuel into combustion chamber 30 in three stages. In a first stage, controller 150 generates first pilot pulse 200 that actuates fuel injector 70 to introduce a first amount of pilot fuel late in the combustion stroke into combustion chamber 30. The pilot fuel introduced in the first stage combusts in a diffusion combustion mode. In a second stage, controller 150 generates first main pulse 210 that actuates direct fuel injector 70 to introduce a first amount of main fuel into combustion chamber 30. The main fuel is introduced later in the compression stroke than the pilot fuel. The first amount of main fuel ignites due to the pressure and temperature resulting from the combustion of the pilot fuel. In a third stage, controller 150 generates second main pulse 220 that actuates direct fuel injector 70 to introduce a second amount of main fuel into combustion chamber 30. The pressure and temperature resulting from the combustion of the pilot fuel and the first amount of main fuel provide an environment suitable for the ignition of the second amount of main fuel. The main fuel introduced in the second and third stages does not have time to mix with the air charge in the combustion chamber to form a homogenous charge, and burns in a diffusion combustion mode. Both the first and second amounts of main fuel are required to meet the load and speed demand of the engine.

First pilot pulse start of injection timing (Pilot SOI1) is within a range of 50 degrees before top dead center (° BTDC) to 10° BTDC, and more preferably within a range of 30° BTDC and 10° BTDC, and is determined as a function of engine operating conditions. First pilot pulse width (Pilot PW1) actuates direct fuel injector 70 to introduce an amount of pilot fuel less than 10% of total fuel introduced into combustion chamber 30 on an energy basis, and preferably around or less than 5%, and is determined as a function of engine operating conditions. First main pulse start of injection timing (Main SOI1) is within a range of 30° BTDC to 0° BTDC and is determined as a function of engine operating conditions. First main pulse width (Main PW1) is also determined as a function of engine operating conditions and typically actuates direct fuel injector 70 to provide between 30% and 70% of the main fuel. Second main pulse start of injection timing (Main SOI2) is within a range of 20° BTDC to 20° ATDC and is determined as a function of engine operating conditions. Second main pulse width (Main PW2) is also determined as a function of engine operating conditions and typically actuates direct fuel injector 70 to provide between 30% and 70% of the main fuel. In a preferred embodiment, pilot-main time separation (Pilot SEP), between the falling edge (ending) of first pilot pulse 200 and the rising edge (beginning) of first main pulse 210, is between 200 to 400 microseconds, and main-main time separation (Main SEP), between the falling edge (ending) of first main pulse 210 and the rising edge (beginning) of second main pulse 220, is between 500 and 750 microseconds. In the illustrated embodiments, rising edges define beginnings of fuel injection pulses, and falling edges define endings of fuel injection pulses. As would be understood by those familiar with the technology it is possible in other embodiments to define falling edges as beginnings of fuel injection pulses and rising edges as endings of fuel injection pulses (that is, employing negative logic).

The peak combustion temperature and pressure are reduced by introducing main fuel in two stages in combustion chamber 30, compared to introducing the same amount of gaseous fuel in a single stage, thereby reducing the formation of NOx. In other embodiments, there can be more than two stages of main fuel injection to maintain combustion temperature and pressure within suitable ranges for control of NOx. Combustion stability is improved and the amounts of unburned hydrocarbons (UHC) are reduced by burning the first and second amount of main fuel in a diffusion combustion mode.

Figure 4:
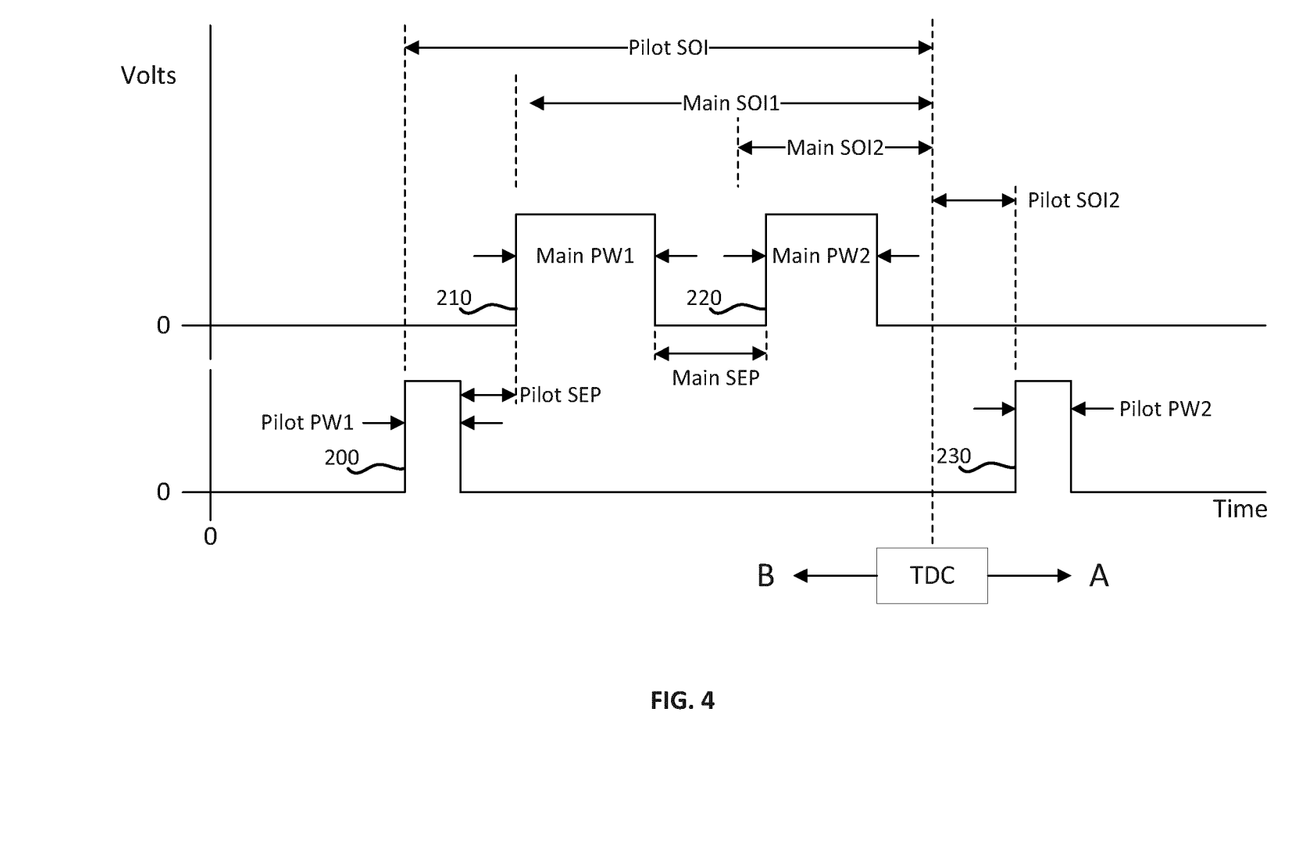
FIG. 4 is a plot view of actuation signals for a fuel injector of FIG. 2 according to a second embodiment comprising a first pilot pulse, a first main pulse, a second main pulse and a second pilot pulse.

Referring now to FIG. 4, a technique of introducing pilot fuel and main fuel is illustrated according to a second embodiment, which is similar to the first embodiment and like parts will have like reference numerals and will not be discussed in detail if at all. For certain regions in the load and speed range of engine 20 it is advantageous for controller 150 to generate second pilot pulse 230 to introduce a second amount of pilot fuel in a fourth stage of fuel injection after the main fuel is introduced. Second pilot pulse 230 is advantageous when fuelling for engine 20 changes from a first mode of relatively a large amount of fuelling to a second mode of relatively a little amount of fuelling, for example from full fuelling to idle. Introducing a second amount of pilot fuel helps to stabilize pilot fuel pressure as it changes between the two modes. Second pilot pulse start of injection timing (Pilot SOI2) is within a range of 0 degrees after top dead center (° ATDC) to 50° ATDC and is determined as a function of engine operating conditions. Second pilot pulse width (Pilot PW2) is selected to introduce a second amount of pilot fuel suitable to stabilize diesel rail pressure within a predetermined time limit, and is determined as a function of engine operating conditions.

Figure 1:
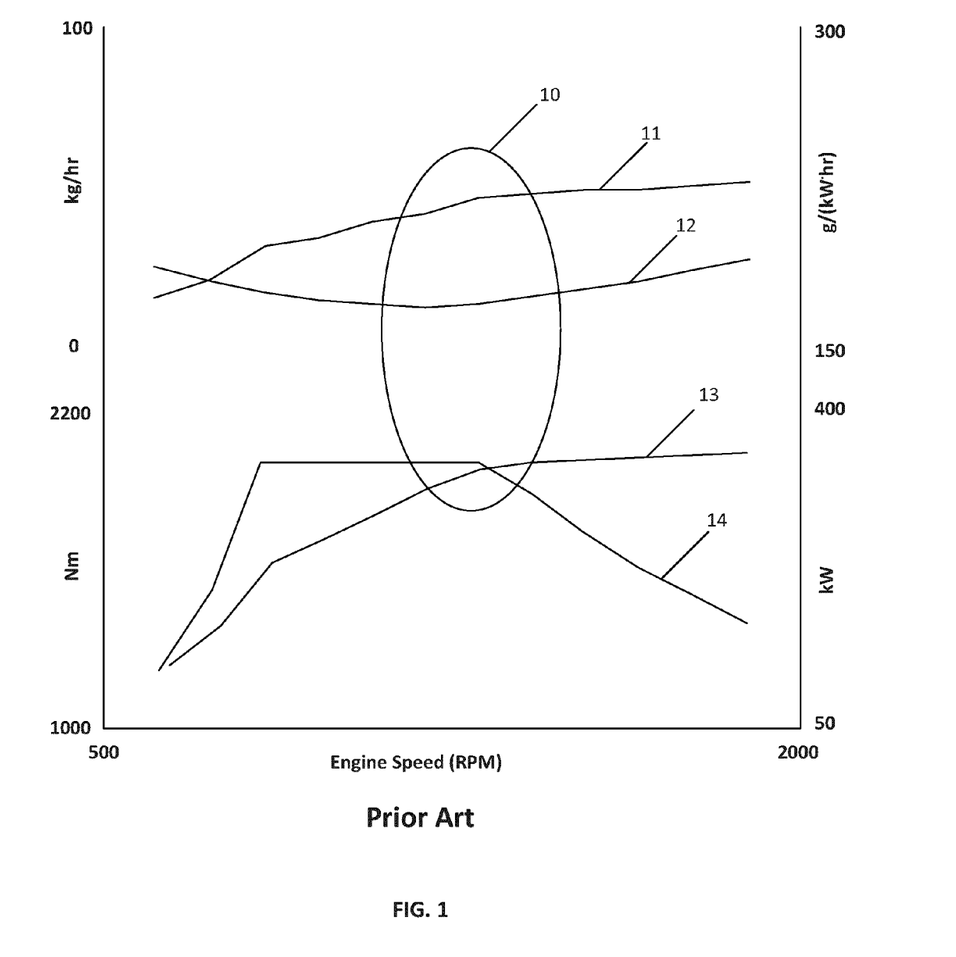
FIG. 1 is a plot view illustrating power versus engine speed plot 13, torque versus engine speed plot 14, fuel consumption versus engine speed plot 11 and fuel consumption rate versus engine speed plot 12 for a gaseous fuelled Diesel-cycle internal combustion engine, and a characteristic region where NOx formation can be high.

In certain regions of the load and speed range of engine 20 the formation of NOx can be excessively high, such as in characteristic region 10 illustrated in FIG. 1. In these regions a different engine map comprising a calibration for reducing NOx formation can be employed. In the context of this application an engine map comprises fuelling (pulse width) and timing (start of injection) calibrations as a function of engine load and speed for pilot pulse 200, first and second main pulses 210 and 220, and when employed, second pilot pulse 230. For example, a first engine map can be employed outside characteristic region 10 in FIG. 1 and a second engine map can be employed within characteristic region 10. The benefits of employing the second engine map comprise reducing NOx formation in characteristic region 10. However, there are tradeoffs in employing the second engine map such as increasing other emissions and increasing exhaust temperature (as opposed to combustion temperature) as a result of, for example in one embodiment of the second engine map, delayed start of injection timing. The operating point of engine 20 (that is the load and speed of the engine) may enter characteristic region 10 transiently and momentarily, which tends not to increase NOx emissions. Momentary excursions into characteristic region 10 can be tolerated and the first engine map can be employed during these momentary excursions. The second engine map is employed to reduce NOx emissions after engine 20 has been operating in characteristic region 10 for a predetermined amount of time.

Figure 5:
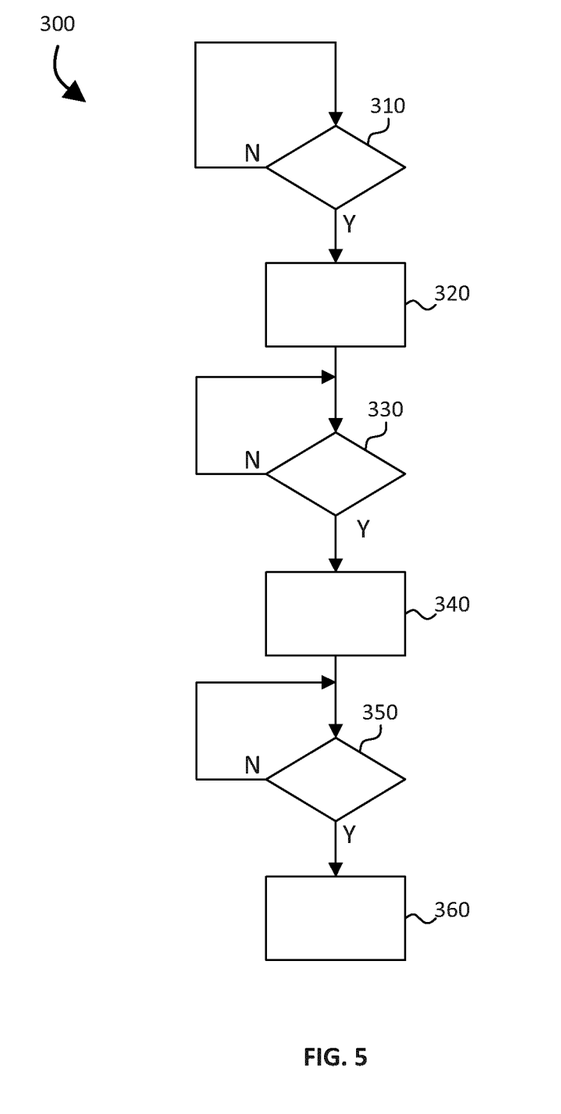
FIG. 5 is a flow chart of a technique for dynamically blending a first engine map and a second engine map as the operating point of the internal combustion engine of FIG. 2 transitions from a first characteristic region to a second characteristic region of the load and speed range of the engine.

Referring now to FIG. 5, a technique of blending the first and second engine maps as engine 20 transitions between operational regions is discussed. Algorithm 300, which is programmed in controller 150, can be employed when engine 20 transitions between operating outside characteristic region 10, employing the first engine map, to operating inside characteristic region 10, employing the second engine map. Similarly, algorithm 300 can be employed when engine 20 transitions between operating inside characteristic region 10, employing the second engine map, to operating outside characteristic region 10, employing the first engine map. More generally, algorithm 300 can be employed when engine 20 transitions between any two regions of the load and speed range of the engine where it is desirable to employ separate engine maps between these two regions. Algorithm 300 is now described for when engine 20 is transitioning from operating in a first characteristic region, employing a first engine map, to operating inside a second characteristic region 10, employing a second engine map. The initial conditions for algorithm 300 comprise engine 20 operating in the first characteristic region for a predetermined amount of time. In step 310 controller 150 determines whether the operating point for engine 20 has transitioned from the first characteristic region into the second characteristic region. If the operating point has transitioned into the second characteristic region, then in step 320 controller 150 starts a timer for indicating how long engine 20 has been operating inside the second characteristic region. Additionally in step 320, controller 150 sets first engine map ratio $R_{M1}$ and second engine map ratio $R_{M2}$, which are employed to dynamically blend the fuelling (pulse width) and timing (start of injection) calibrations from the first and second engine maps according to Equations 1 and 2 below. In Equation 1, final fuelling amount $F_F$ is equal to first fuelling amount $F_1$ (from the first engine map) multiplied by first engine map ratio $R_{M1}$ plus second fuelling amount $F_2$ (from the second engine map) multiplied by second fuelling map ratio $R_{M2}$. In equation 2, final timing $T_F$ is equal to first timing $T_1$ (from the first engine map) multiplied by first engine map ratio $R_{M1}$ plus second timing $T_2$ (from the first engine map) multiplied by second fuelling map ratio $R_{M2}$. There are respective equations 1 and 2 for each of first and second pilot pulses 200 and 230, and first and second main pulses 210 and 220. Equation 3 illustrates a preferred relationship between first engine map ratio $R_{M1}$ and second engine map ratio $R_{M2}$, and can be employed to replace the second engine ratio $R_{M2}$ in the calculations. In other embodiments separate weighting factors (not related by Equation 3) can be employed to blend the first engine and the second engine maps, instead of ratios $R_{M1}$ and $R_{M2}$. In step 320 first engine map ratio $R_{M1}$ is set to one (1) and second engine map ratio $R_{M2}$ is set to zero (0). That is, during momentary excursions into the second characteristic region the first engine map is employed exclusively.

$$F_F = R_{M1} * F_1 + R_{M2} * F_2 \quad \text{Equation 1}$$

$$T_F = R_{M1} * T_1 + R_{M2} * T_2 \quad \text{Equation 2}$$

$$R_{M2} = 1 - R_{M1} \quad \text{Equation 3}$$

In step 330 controller 150 determines whether the timer started in step 320 has reached a first time threshold, and if it has reached the first time threshold then first engine map ratio $R_{M1}$ and second engine map ratio $R_{M2}$ are updated with new values in step 340 such that the second engine map begins to influence the final fuelling and timing, and the first engine map influences the final fuelling and timing to a lesser degree. In a preferred embodiment first and second engine map ratios $R_{M1}$ and $R_{M2}$ are each set to one half (0.5). Combustion stability is improved by blending the first and second engine maps when transitioning between the first and second characteristic regions. In step 350 controller 150 determines whether the timer started in step 320 has reached a second time threshold. If the timer has reached the second time threshold then first engine map ratio $R_{M1}$ and second engine map ratio $R_{M2}$ are updated with new values in step 360 such that the second engine map influences the final fuelling and timing exclusively and the first engine map does not influence the final fuelling and timing at all. That is, first engine map ratio $R_{M1}$ is set to zero (0) and second engine map ratio $R_{M2}$ is set to one (1). Engine 20 has now been operating in the second characteristic region for a predetermined amount of time. First engine map ratio $R_{M1}$ and second engine map ratio $R_{M2}$ are reset to 100 and 0 respectively if the operating point of engine 20 exits the second characteristic region at any time before the timer has reached the second time threshold, and control returns to step 310. Although two time thresholds are employed in algorithm 300, it is understood that two or more timer thresholds can be employed in other embodiments using appropriate settings during each timing increment for first engine map ratio $R_{M1}$ and second engine map ratio $R_{M2}$ accordingly. In another preferred embodiment a first temperature threshold can be employed instead of the first time threshold and a second temperature threshold can be employed instead of the second time threshold, and a temperature sensor (not shown) can be employed instead of the timer. The temperature sensor is operative connected with and sends signals to controller 150, the signals are representative of combustion temperature.

The techniques described herein reduce the rate of NOx formation across the load and speed range of Diesel-cycle internal combustion engines that burn a gaseous fuel in diffusion combustion mode. Multiple fuel injection stages reduce peak combustion temperature and pressure thereby reducing NOx formation. Multiple engine maps can be employed in a variety of characteristic regions of engine operation where each engine map is calibrated for a desired result, such as reduced NOx formation. A technique of transitioning between engine maps was discussed that dynamically blends the fuelling and timing between the engines maps, such that momentary excursions between these characteristic regions do not instantly change the engine calibration, and the engine transitions between calibrations in a controlled manner. This improves combustion stability and efficiency, which helps to reduce unwanted emissions. Experimental results have illustrated a 20% NOx reduction in a high load region of operation and a 40% reduction in a low load region of operation.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of fuel injection for an internal combustion engine fuelled with a gaseous fuel comprising:

introducing a first amount of pilot fuel in a first stage of fuel injection;

introducing a first amount of main fuel in a second stage of fuel injection; and introducing a second amount of main fuel in a third stage of fuel injection, said first and second amounts of main fuel contribute to load and speed demand of said internal combustion engine;

wherein said main fuel is said gaseous fuel, and said pilot fuel and said main fuel burn in a diffusion combustion mode.

2. The method of claim 1, wherein when an operating point of said internal combustion engine transitions from a first characteristic region to a second characteristic region, for at least one of said first, second and third stages of fuel injection the method further comprising:

employing calibrations from a first engine map after said operating point transitions into said second characteristic region while a first measured parameter is less than a first predetermined threshold;

while said first measured parameter is between said first predetermined threshold and a second predetermined threshold:

blending calibrations from said first engine map and a second engine map; and employing said blended calibrations; and employing calibrations from said second engine map when said first measured parameter is greater than said second predetermined threshold.

3. The method of claim 2, wherein at least one of:

said first measured parameter is time and said first and second predetermined thresholds are first and second predetermined time thresholds respectively; and said first measured parameter is a temperature characteristic of combustion temperature and said first and second predetermined thresholds are first and second predetermined temperature thresholds respectively.

4. The method of claim 2 further comprising employing said first engine map in said first characteristic region.

5. The method of claim 2 wherein at least one of:

said calibrations from said first and second engine maps comprise fuelling and timing calibrations; and a ratio is employed to blend said first and second engine maps.

6. The method of claim 1 wherein at least one of:

said first stage of fuel injection occurs between 50° BTDC and 10° BTDC; and said second stage of fuel injection occurs between 30° BTDC and 0° BTDC; and said third stage of fuel injection occurs between 20° BTDC and 20° ATDC; and a separation timing between an ending of a fuel injection pulse employed in said first stage of fuel injection and a beginning of a fuel injection pulse employed in said second stage of fuel injection is between 200 and 400 microseconds; and a separation timing between an ending of a fuel injection pulse employed in said second stage of fuel injection and a beginning of a fuel injection pulse employed in said third stage of fuel injection is between 500 and 750 microseconds.

7. The method of claim 1 further comprising at least one of:

introducing a second amount of pilot fuel in a fourth stage of fuel injection; and introducing a second amount of pilot fuel in a fourth stage of fuel injection, wherein said fourth stage of fuel injection occurs between 0° ATDC and 50° ATDC.

8. An apparatus for fuel injection in an internal combustion engine fuelled with a gaseous fuel comprising:
a direct injection apparatus for directly introducing a pilot fuel and a main fuel into a combustion chamber of said internal combustion engine, said main fuel is said gaseous fuel;
a pilot fuel supply system delivering said pilot fuel to said direct injection apparatus;
a main fuel supply system delivering said main fuel to said direct injection apparatus;
a controller configured to actuate said direct injection apparatus to introduce said pilot fuel and said main fuel into said combustion chamber, and programmed to:
actuate said direct injection apparatus in a first stage of fuel injection to introduce a first amount of pilot fuel;
actuate said direct injection apparatus in a second stage of fuel injection to introduce a first amount of main fuel; and
actuate said direct injection apparatus in a third stage of fuel injection to introduce a second amount of main fuel, said first and second amounts of main fuel contribute to load and speed demand of said internal combustion engine;
wherein said pilot fuel and said main fuel burn in a diffusion combustion mode.

9. The apparatus of claim 8, wherein when an operating point of said internal combustion engine transitions from a first characteristic region to a second characteristic region, for at least one of said first, second and third stages of fuel injection said controller is further programmed to:
employ calibrations from a first engine map after said operating point transitions into said second characteristic region while a first measured parameter is less than a first predetermined threshold;
while said first measured parameter is between said first predetermined threshold and a second predetermined threshold:
blend calibrations from said first engine map and a second engine map; and
employ said blended calibrations; and
employ calibrations from said second engine map when said first measured parameter is greater than said second predetermined threshold.

10. The apparatus of claim 9 wherein at least one of:
said first measured parameter is time and said first and second predetermined thresholds are first and second predetermined time thresholds respectively; and
said first measured parameter is a temperature characteristic of combustion temperature and said first and second predetermined thresholds are first and second predetermined temperature thresholds respectively.

11. The apparatus of claim 9 wherein at least one of:
said controller is further programmed to employ said first engine map in said first characteristic region; and
said calibrations from said first and second engine maps comprise fuelling and timing calibrations; and
a ratio is employed to blend said first and second engine maps.

12. The apparatus of claim 8 wherein at least one of:
said first stage of fuel injection occurs between 50° BTDC and 10° BTDC; and
said second stage of fuel injection occurs between 30° BTDC and 0° BTDC; and
said third stage of fuel injection occurs between 20° BTDC and 20° ATDC.

13. The apparatus of claim 8 wherein at least one of:
a separation timing between an ending of a fuel injection pulse employed in said first stage of fuel injection and a beginning of a fuel injection pulse employed in said second stage of fuel injection is between 200 and 400 microseconds; and
a separation timing between an ending of a fuel injection pulse employed in said second stage of fuel injection and a beginning of a fuel injection pulse employed in said third stage of fuel injection is between 500 and 750 microseconds.

14. The apparatus of claim 8 wherein at least one of:
said controller is further programmed to actuate said direct injection apparatus in a fourth stage of fuel injection to introduce a second amount of pilot fuel; and
said controller is further programmed to actuate said direct injection apparatus in a fourth stage of fuel injection to introduce a second amount of pilot fuel, and said fourth stage of fuel injection occurs between 0° ATDC and 50° ATDC.

15. The apparatus of claim 8 wherein at least one of:
said direct injection apparatus comprises a concentric needle fuel injection valve; and
said direct injection apparatus comprises a pilot fuel direct injector operatively connected with said pilot fuel supply system, and a main fuel direct injector operatively connected with said main fuel supply system.

16. A method of fuel injection for an internal combustion engine fuelled with a gaseous fuel comprising:
when an operating point of said internal combustion engine transitions from a first characteristic region to a second characteristic region, when injecting said gaseous fuel:
employing calibrations from a first engine map after said operating point transitions into said second characteristic region while a first measured parameter is less than a first predetermined threshold;
while said first measured parameter is between said first predetermined threshold and a second predetermined threshold:
blending calibrations from said first engine map and a second engine map; and
employing said blended calibrations; and
employing calibrations from said second engine map when said first measured parameter is greater than said second predetermined threshold.

17. The method of claim 16, wherein at least one of:
said first measured parameter is time and said first and second predetermined thresholds are first and second predetermined time thresholds; and
said first measured parameter is a temperature characteristic of combustion temperature and said first and second predetermined thresholds are first and second predetermined temperature thresholds.

18. The method of claim 16 further comprising:
introducing a first amount of pilot fuel in a first stage of fuel injection;
introducing a first amount of main fuel in a second stage of fuel injection; and
introducing a second amount of main fuel in a third stage of fuel injection, said first and second amounts of main fuel contribute to load and speed demand of said internal combustion engine;
wherein said main fuel is said gaseous fuel.

19. An apparatus for fuel injection in an internal combustion engine fuelled with a gaseous fuel comprising:
- a direct injection apparatus for directly introducing a main fuel into a combustion chamber of said internal combustion engine, said main fuel is said gaseous fuel;
- a main fuel supply system delivering said main fuel to said direct injection apparatus;
- a controller configured to actuate said direct injection apparatus to introduce said main fuel into said combustion chamber, when an operating point of said internal combustion engine transitions from a first characteristic region to a second characteristic region, when injecting said gaseous fuel said controller is programmed to:
  - employ calibrations from a first engine map after said operating point transitions into said second characteristic region while a first measured parameter is less than a first predetermined threshold;
  - while said first measured parameter is between said first predetermined threshold and a second predetermined threshold:
    - blend calibrations from said first engine map and a second engine map; and
    - employ said blended calibrations; and
  - employ calibrations from said second engine map when said first measured parameter is greater than said second predetermined threshold.

20. The apparatus of claim 19, wherein at least one of:
- said first measured parameter is time and said first and second predetermined thresholds are first and second predetermined time thresholds respectively; and
- said first measured parameter is a temperature characteristic of combustion temperature and said first and second predetermined thresholds are first and second predetermined temperature thresholds respectively; and further comprising
- a pilot fuel supply system delivering said pilot fuel to said direct injection apparatus, said controller is further programmed to:
  - actuate said direct injection apparatus in a first stage of fuel injection to introduce a first amount of pilot fuel;
  - actuate said direct injection apparatus in a second stage of fuel injection to introduce a first amount of main fuel; and
  - actuate said direct injection apparatus in a third stage of fuel injection to introduce a second amount of main fuel.

* * * * *